United States Patent [19]

Naimpally

[11] Patent Number: 4,827,343

[45] Date of Patent: May 2, 1989

[54] METHOD AND APPARATUS FOR REDUCING ANALOG/DIGITAL CONVERTER REQUIREMENTS IN PICTURE-IN-PICTURE TELEVISION CIRCUITS

[75] Inventor: Saiprasad V. Naimpally, Knoxville, Tenn.

[73] Assignee: North American Philips Consumer Elec. Corp., New York, N.Y.

[21] Appl. No.: 104,325

[22] Filed: Oct. 2, 1987

[51] Int. Cl.⁴ .............................................. H04N 5/262
[52] U.S. Cl. ..................................... 358/183; 358/166
[58] Field of Search ....................... 358/183, 138, 166; 340/347 AD

[56] References Cited

U.S. PATENT DOCUMENTS

| | | | |
|---|---|---|---|
| 4,095,259 | 6/1978 | Sawagata | 358/138 |
| 4,352,123 | 9/1982 | Flamm | 358/23 |
| 4,550,309 | 10/1985 | Hiller et al. | 340/347 AD |
| 4,665,438 | 5/1987 | Miron et al. | 358/183 |
| 4,665,439 | 5/1987 | Naimpally | 358/138 |
| 4,684,983 | 8/1987 | Acampora et al. | 358/138 |
| 4,710,747 | 12/1987 | Holland | 340/347 AD |

Primary Examiner—John W. Shepperd
Assistant Examiner—John K. Peng
Attorney, Agent, or Firm—Edward W. Goodman

[57] ABSTRACT

In the PIP circuit of a television receiver, the resolution of the analog-to-digital converter is improved by one bit. This is done by adding a dither signal, having an amplitude equal to one-half the least significant bit at the converter output to the analog input signal throughout specific lines of the input signal. If the converter output signal is filtered by a piecewise recursive filter, in which every third line is a valid line, the other two being discarded in the subsequent PIP processor, then the dither signal is applied during the valid line and the line two lines removed from the valid line, i.e. the line following the previous valid line. If the filter is a FIR filter then the dither signal is applied during alternate lines.

1 Claim, 4 Drawing Sheets

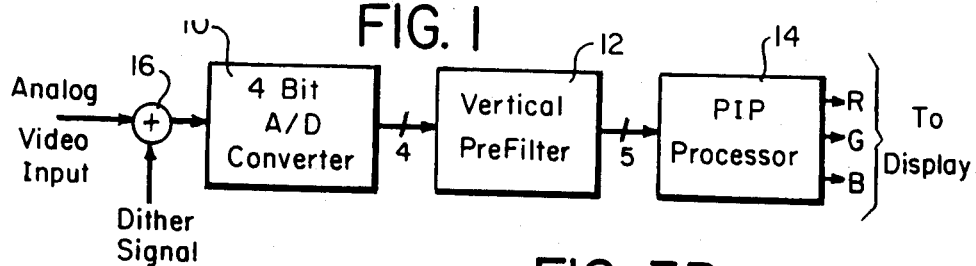
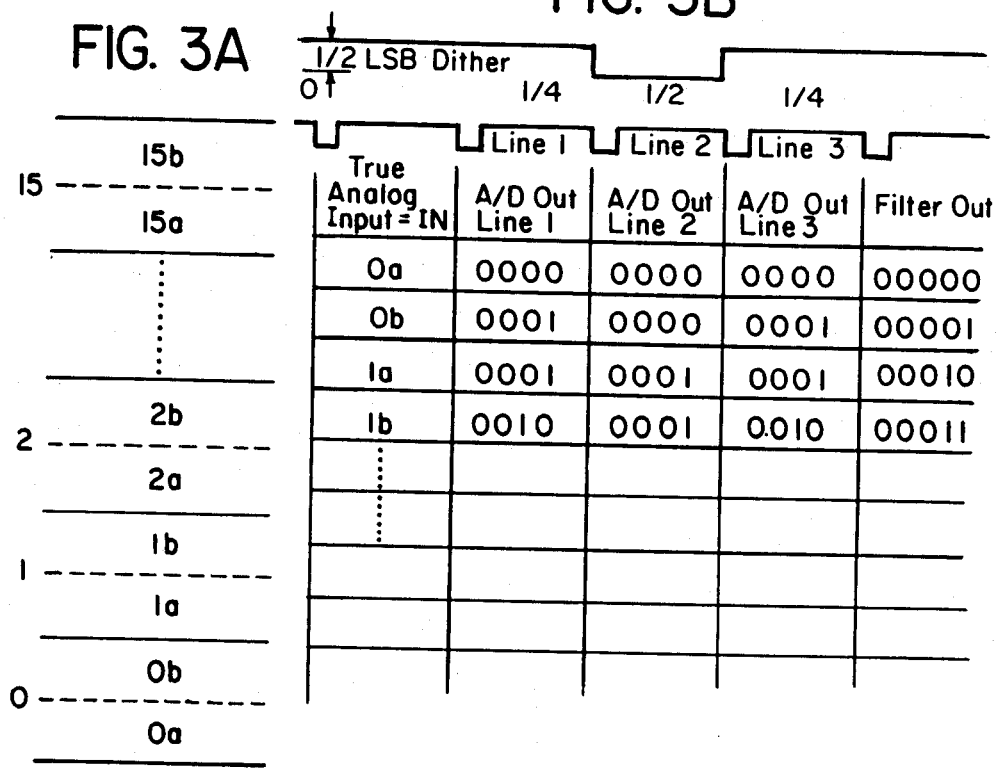
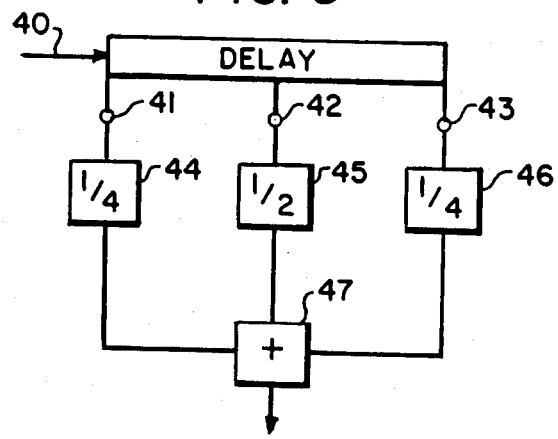

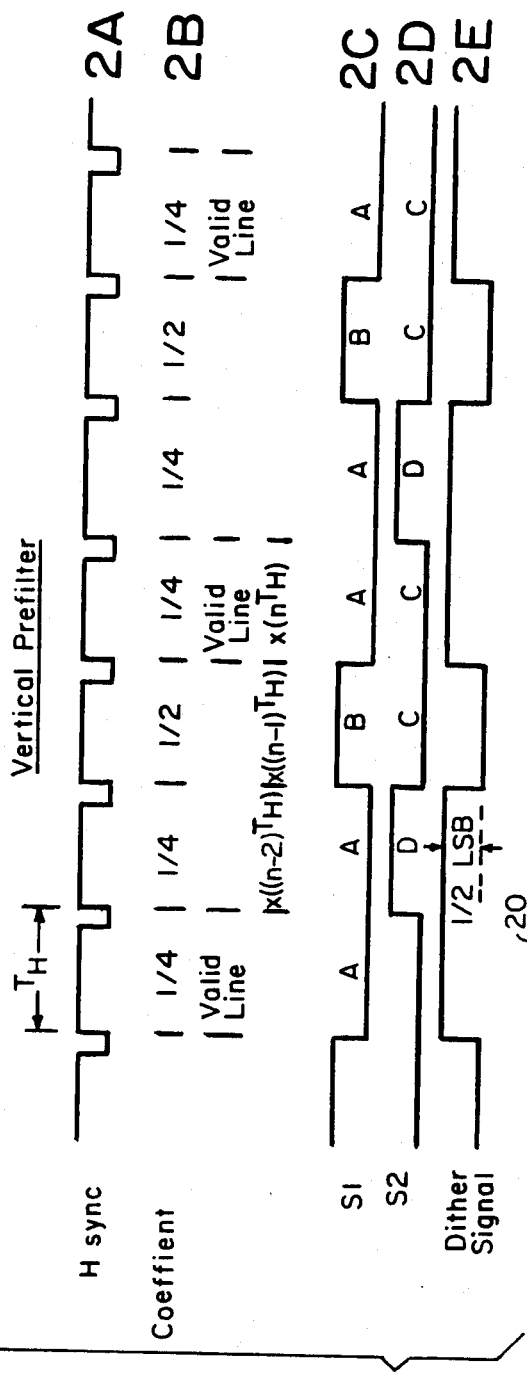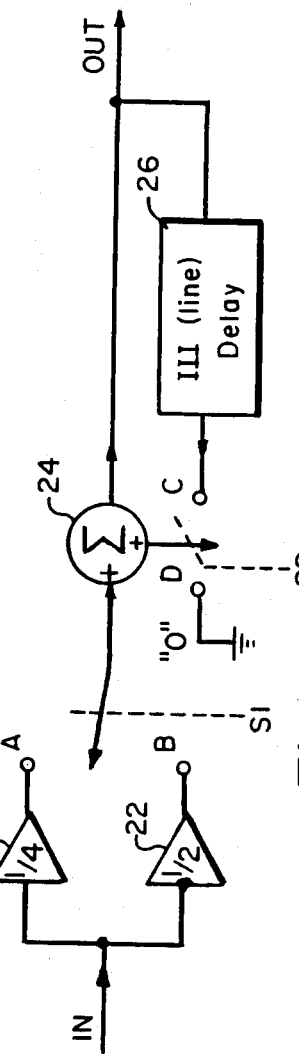

METHOD AND APPARATUS FOR REDUCING ANALOG/DIGITAL CONVERTER REQUIREMENTS IN PICTURE-IN-PICTURE TELEVISION CIRCUITS

CROSS REFERENCE TO RELATED APPLICATIONS

The present invention is related to U.S. Pat. No. 4,665,439 issued 5/12/87 by the same inventor and assigned to the same assignee.

BACKGROUND OF THE INVENTION

Field of the Invention

The present invention relates to circuitry associated with video displays having a picture-in-picture feature.

Television receivers are known in which a second, smaller picture is displayed within the main picture. In the known systems, the baseband video signal for the second picture is digitized and subjected to vertical prefiltering. The vertical prefilter is a low-pass filter whose output is vertically sub-sampled by a 3:1 factor and displayed in a compressed form as part of the main picture. The vertical prefilter is required to band limit the video signal prior to the sub-sampling so as to reduce aliasing artifacts and interline flicker. In the known systems, the analog/digital converter is capable of a five-bit resolution, i.e. has at least five-bits. It provides a five bit video output signal for further processing. The expense involved in a five-bit or over analog/digital converter far exceeds that of a four-bit converter.

SUMMARY OF THE INVENTION

It is an object of the present invention to provide an input to the analog/digital converter which allows a five-bit resolution at the output of a converter-filter system even though the basic resolution of the analog/digital converter is only four bits.

It is a further object of the present invention to achieve this added resolution with only minimum added cost and without a decrease in the reliability and performance of the receiver.

In accordance with the present invention, an analog television signal is received. It is converted to a digital signal in an analog-to-digital converter having an n−1 bit output. The converter output signal is subsequently filtered by a low-pass filter. The resulting digital output signal has a resolution of n bits, i.e. a resolution which is one bit more than that of the converter being used. This objective is achieved by adding a dither signal, having a predetermined amplitude less than the amplitude signified by the least significant one of the n−1 bits of the converter output, to the analog input signal in synchronim therewith. Specifically, the amplitude of the dither signal will be one-half of the least significant converter output bit. The resulting final analog signal is applied to the converter whose output signal is, in turn, filtered. The timing of the application of the dither signal relative to the T.V. analog input signal is matched to the particular type of low-pass filter used.

The operation as well as other features and advantages of the present invention will become apparent upon consideration of the following detailed description, when read in conjunction with the drawings.

BRIEF DESCRIPTION OF THE DRAWINGS

FIG. 1 is an overall block diagram of the picture-in-picture circuits in a television receiver;

FIGS. 2A–E include a block diagram of a piecewise-recursive vertical filter having a valid ouput for every third horizontal line and associated timing diagrams;

FIGS. 3A and 3B are diagrams illustrating analog input levels and corresponding digital output signals;

FIG. 4 is a schematic diagram of a piecewise-recursive vertical prefilter;

FIG. 5 is a schematic diagram of a finite impulse response vertical prefilter;

DESCRIPTION OF THE PREFERRED EMBODIMENT

Figure 6:
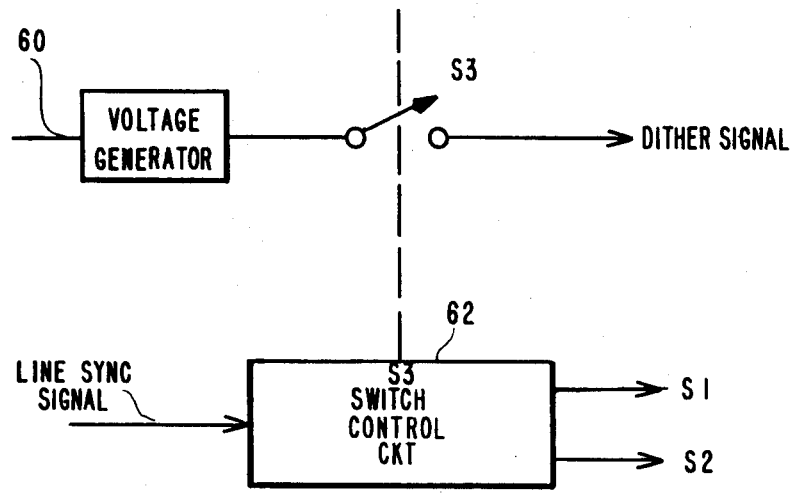
FIG. 6 is a block diagram of an arrangement for generating the dither signal.

Television receivers with a picture-in-picture (PIP) feature are, at the present time, well-known. The display on a receiver having a PIP feature is a large picture with a substantially smaller picture inserted into a particular portion thereof. The picture which is to feed the PIP or smaller picture is received and converted to baseband in exactly the same fashion as is the main picture. The demodulated baseband signal is then subjected to analog/digital conversion. It has been found that a five-bit resolution is required for the analog/digital converter to achieve a picture-in-picture which is satisfactory to the viewer. Presently used analog/digital converters corresponding to the analog/digital converter 10 illustrated in FIG. 1 have a five-bit resolution. As shown in FIG. 1, the output of the analog/digital converter is then applied to a vertical filter 12. Filter 12 is a low-pass filter. Its output is sub-sampled by a 3:1 factor and displayed in compressed form, as mentioned above, as part of the main picture. The sub-sampling is performed in a PIP processor 14. Vertical filter 12 is essential to reduce aliasing artifacts and interline flicker in the compressed signal.

In order to obtain the five-bit resolution mentioned above, an analog/digital converter having at least a five-bit output would be required. However, the expense of five-bit analog/digital converters far exceeds that of four-bit converters. It is thus the object of the present invention to obtain a PIP video signal with five-bit resolution at the output of the vertical filter, even though the analog/digital converter generates a four-bit signal.

As can be seen from FIG. 1, it is proposed that a dither signal be added to the video input signal in an adder 16 to achieve the five-bit resolution from the four-bit analog/digital converter.

The dither signal which must be used to achieve the desired resolution must be matched to the particular vertical filter in the receiver, as will now be described.

As mentioned above, the PIP processor 14 selects every third line from its input to constitute a valid line. Each valid line is to be constituted by samples y(n) according to the following equation:

$$y(n) = \frac{x(n)}{4} + \frac{x((n-1))}{2} + \frac{x((n-2))}{4}$$

where x(n) is the sample value from the present line (n);

x(n−1) is the spatially corresponding sample value from the immediately preceding line (n−1); and x(n−2) is the spatially corresponding sample value from the line (n−2) immediately previous to line (n−1).

This equation can be implemented in many ways. A preferred embodiment is illustrated in FIG. 4 and a second embodiment in FIG. 5.

Referring first to FIG. 2, the horizontal synchronization signals of the incoming video signal are illustrated in line 2A. The video signals in the sequential lines are divided into groups of three, namely one valid line and two lines which will be discarded by PIP processor 14. As shown in line 2B, and in conformance with the requirements of the above equation, all samples from a valid line, i.e. a line to be retained in PIP processor 14, are divided by a factor of 4. All samples from the next previous line are divided by a factor of 2, while all samples from the last line in the group, namely, the line immediately preceding the previous valid line, are divided by a factor of 4.

A piecewise recursive filter, a preferred embodiment of low pass filter means, is illustrated in FIG. 2F.

As illustrated there, the incoming digital signal is applied simultaneously to a divider 20 which divides by a factor of 4, and a divider 22 which divides by a factor of 2. The output terminals of dividers 20 and 22 are labelled A and B, respectively. A first input of an adder 24 is alternately connected to terminal A or terminal B under control of a switch S1. A second input of adder 24 is alternately connected to a terminal C and a terminal D, the latter being digital zero; under control of a switch S2. The output of adder 24 is applied to the input of a 1H line delay 26 whose output is the above-mentioned terminal C.

Keeping in mind that only every third line has to be correct, since the other two lines will be discarded in PIP processor 14, the above-described filter operates as follows: During the first line following a "valid line", the filter is reset, i.e. switch S2 switches the second input of adder 24 to terminal D, while switch S1 switches the first input to terminal A. The output of adder 24, which is applied to the input of 1H delay 26, thus has an amplitude of one-quarter of each input sample, plus zero. During the next line, switch S1 switches the first input of adder 24 to terminal B, while switch S2 switches the second input to terminal C. The output of the adder 24, again applied to delay 26, is one-half of each of the current input sample values plus one-quarter of the value of the corresponding sample from the previous line. These values are again dropped in PIP processor 14. Finally, for the third line following a valid line, i.e. again a valid line, switch S1 connects the first adder input to terminal A, while switch S2 maintains the contact between terminal C and the second input of adder 24. The output of the filter is, for each sample of that line, one-quarter of the present sample value plus the output from delay line 26, namely one-half of each sample value from the immediately preceding line plus one-quarter of sample values from the line delayed by two times the horizontal line period. Thus for every third line the above equation is implemented exactly.

The filtering process described above is also described in the cross-referenced U.S. patent. Its description is included here to the extent necessary to illustrate its interaction with the proposed dither signal.

The above-described operation of switches S1 and S2 is indicated in the timing diagram of FIG. 2 on lines 2C and 2D.

A proposed dither signal for increasing the resolution of the signal at the output of the vertical filter is illustrated in FIG. 2, line 2E. As illustrated there, a dither signal, having an amplitude of one-half of the amplitude signified by the least significant bit of the analog/digital converter output, is added to the analog signal (see also FIG. 1) prior to conversion. Specifically, this signal is added during the two adjacent lines in which the value of the input signal will be divided by a factor of 4 in divider 20, i.e. during each valid line and the line immediately following the valid line. Alternatively, although not illustrated, the dither signal could be applied only during the line in which divider 22 is active, i.e. the line in which the digital signals at the output of analog/digital converter 10 are divided by a factor of 2. If this dither signal is added to the input of a four-bit analog/digital converter 10, the output of vertical filter 12 will be accurate to a five-bit resolution as demonstrated in FIGS. 3A and 3B.

In FIG. 3A, the analog signal is illustrated as being divided into a plurality of levels, 0, 1, 2, etc. as indicated by solid lines. These levels indicate the digitizing or quantizing levels in analog/digital converter 10. The extra resolution to be achieved by the ½ LSB dither signal is illustrated by the dotted lines. These dotted lines divide each of the indicated digitizing levels in half. In other words, use of the dither signal permits discrimination between twice as many analog states as does the four-bit analog-to-digital converter per se for the signal at the vertical filter output. FIG. 3B is a table of filter output for different analog input values and the dither signal described above.

As an example, if the actual signal level is within the range 0b, the dither signal wll increase it to level 1a during lines 1 and 3. The output of analog/digital converter 10 during lines 1 and 3 will thus be 0001, while during line 2, where no dither signal is added, the output will be 0000. Under these circumstances:

| Input = 0b | $\frac{\text{Line 1}}{4}$ = 0000.01 |
|---|---|
| Converter Output | $\frac{\text{Line 2}}{2}$ = 0000.00 |
| Line 1 = 0001 | $\frac{\text{Line 3}}{4} = \frac{0000.01}{0000.10}$ |
| Line 2 = 0000 | |
| Line 3 = 0001 | Result = 00001 (output) |

The original analog 0b range is thus accurately digitized to five places. Similar calculations carried out with increasing values to be digitized show the same result. Namely, a dither signal having an amplitude of one-half of the least significant bit will increase input values in the upper half of a quantization region to a value above the next threshold level. The divisions and subsequent additions taking place in the filter then result in a detection of the difference between a "0001" in lines 1 and 3 and a "0000" in line 2 with respect to a "0001" signal in all three lines. In other words, the difference between, for example, level 0b and 1a is reflected in the filter output, as is the level difference between the 0a and 0b. In the latter case, when the video signal to be digitized is in the 0a level, addition of the dither signal does not result in raising its amplitude above the next threshold.

It will be noted that exactly the same situation exists when the dither signal is added only to line 2 and not to lines 1 and 3. The only difference is that the dither signal, instead of creating two "ones" is the sixth place, creates one "one" in the fifth place. Upon addition, the same result occurs.

As illustrated above in connection with a recursive filter, the dither signal had to be applied during specific line intervals relative to the valid line to be extracted by the PIP processor. However, a dither signal can also be used in conjunction with a filter having an output in which every line is valid, i.e. although every third lie will be extracted by the PIP processor, the values generated in the remaining two lines are also correct.

This is the case for a system using a finite impulse response (FIR) filter instead of the piecewise recursive filter. FIR filters are well known in the art and will therefore be only briefly described here. A FIR filter is illustrated in FIG. 5. FIG. 5 shows a delay line 40 having taps 41, 42 and 43. Tap 41 samples the incoming signal; tap 42 samples the signal after a delay equal to one horizontal line period; and tap 43 samples the signal delayed by two horizontal line periods. The outputs at taps 41 and 43 are applied to respective divide-by-four circuits 44, 46, while the output at tap 42 is applied to a divide-by-two circuit 45. The dividing circuits can of course be simply implemented by shift registers. The outputs of the dividing circuits 44, 45 and 46 are summed in a summing circuit 47.

The output of summing circuit 47 is correct during each line interval, not only during every third line interval which will be extracted in the PIP processor. Here, the dither signal is added to the analog video input signal during every other line interval. Reference to FIG. 5 will illustrate without further comment that this results in application of the dither signal either during two line periods in which multiplication will be by one-quarter, or during one line period in which the corresponding converter output signal will be divided by two.

An arrangement for generating the dither signal is shown in FIG. 6. A voltage generator 60 is set to generate an output signal having an amplitude which is less than the amplitude signified by the least significant one of the $n-1$ bits of the output signal of the analog-to-digital converter 10. The output signal of the voltage generator 60 is applied to a switch S3 which has a terminal for supplying the dither signal. The switch S3 is controlled by a switch control circuit 62 which generates switching signals for the switch S3 as well as the switches S1 and S2 of FIG. 4. To this end, the switch control circuit 62 receives the line synchronizing signal which is separated from the analog input signal by a synchronizing signal separating device (not shown). If this arrangement is used with the piecewise-recursive vertical prefilter of FIG. 4, the signals generated by the switch control circuit 62 for the switches S1, S2 and S3 are in accordance with lines 2C, 2D and 2E of FIG. 2. If this arrangement is used with the FIR vertical prefilter of FIG. 5, the signal generated by the switch control circuit 62 activates the switch S3 during every other line interval, or one-half the frequency of the line synchronizing signal.

Figure 7:
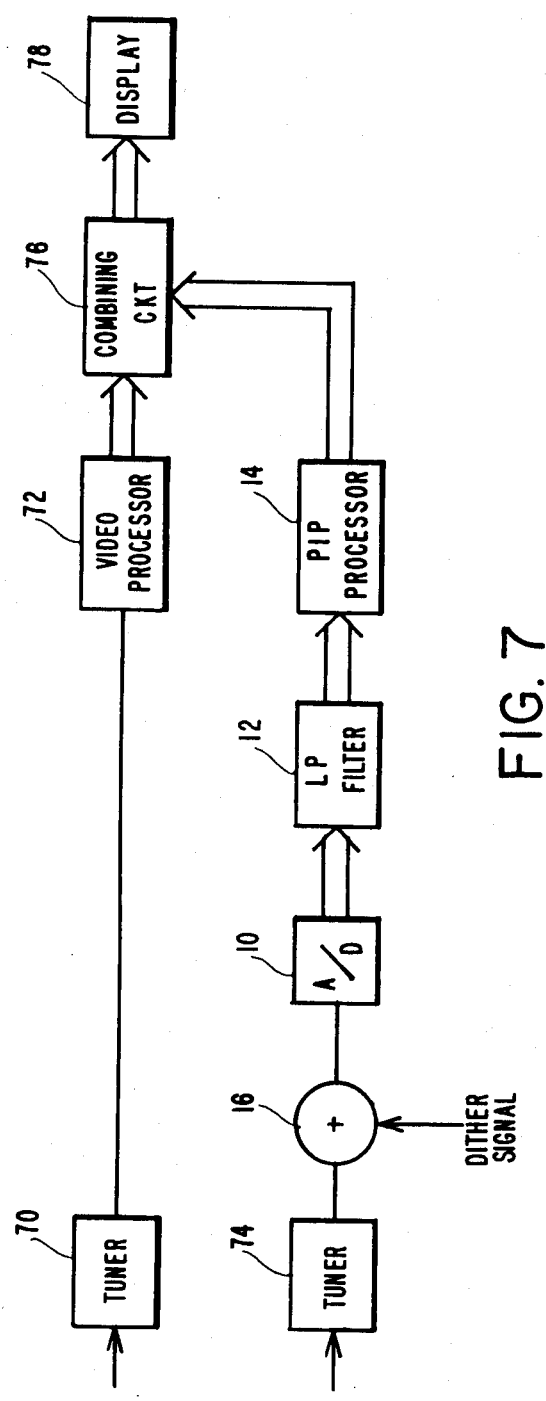
FIG. 7 is a block diagram of a television receiver including the PIP circuits of the subject invention.

A television receiver for making a PIP display is shown in FIG. 7. A first tuner 70 receives a first analog signal for the main picture and provides the same to a video processor 72. At the same time, a second tuner 74 receives a second analog signal and applies this second analog signal to the adder 16, which also receives the dither signal. The output of the adder 16 is applied to the analog-to-digital converter 10 which applies its output to the low-pass filter 12. This filtered output is applied to the PIP processor 14 which applies its output signal, along with the output signal of the video processor 72, to a combining circuit 76. The output of the combining circuit 76 is then applied to a display device 78.

While the invention has been illustrated in application of the dither signal synchronized to the analog input signal for use with two specific types of filters, it will readily be apparent to one skilled in the art that the present invention is applicable wherever analog/digital converter signals having a one bit increase in resolution over an available less expensive unit are desirable. The particular pattern of dither signal with respect to analog input signal must simply be tailored to the type of filter used in connection with the converter.

While the invention has been illustrated in two preferred embodiments, it is not limited thereto, but should be considered an encompassing all embodiments falling within the scope of the following claims.

I claim:

1. In a television apparatus for displaying a main picture and a smaller picture-in-picture within said main picture, said apparatus having first and second receiver means for receiving, respectively, a first and second analog input television signal, each of said analog input television signals being constituted by a plurality of line signals each having a predetermined line period, said apparatus further having analog-to-digital converter means for converting said second analog input television signal to a digital television signal having a resolution of $n-1$ bits, and low-pass filter means connected to said analog-to-digital converter means for low-pass filtering said digital television signal, the improvement comprising:

means for adding a dither signal to said second analog input television signal during predetermined ones of said line signals therein, said dither signal having an amplitude less than the amplitude signified by the least significant one of said $n-1$ bits;

wherein said filter means is a piecewise recursive filter generating a valid line signal for every three consecutive ones of said plurality of line signals;

wherein said dither signal is applied to the one of said line signals occurring during generation of said valid line signal and the line period immediately following said valid line signal; and wherein said filter means filters said digital television signal to a resolution of n bits, whereby an n-bit output signal is generated by said filter means with said analog-to-digital converter means having a resolution of $n-1$ bits.

* * * * *